United States Patent
Duftschmid et al.

[11] Patent Number: 5,841,142
[45] Date of Patent: Nov. 24, 1998

[54] PROCESS AND SYSTEM FOR DETERMINING EXPOSURE IN AIRPLANES

[76] Inventors: Klaus E. Duftschmid, Franz-Schmid-G. 3, A-2352 Gumpoldskirchen; Christian Schmitzer, Gattringerstr. 95, A-2345 Brunn/Geb.; Christian Strachotinsky, Wollzeile 34, A-1010 Vienna, all of Austria

[21] Appl. No.: 394,331

[22] Filed: Feb. 24, 1995

[30] Foreign Application Priority Data

Mar. 1, 1994 [AT] Austria ..................................... 425/94

[51] Int. Cl.⁶ ........................................................ G01T 1/02
[52] U.S. Cl. ........................ 250/395; 250/336.1; 250/526
[58] Field of Search ................... 250/253, 336.1, 250/370.06, 390.04, 395, 526, 370.07

[56] References Cited

U.S. PATENT DOCUMENTS

| | | |
|---|---|---|
| 3,450,878 | 6/1969 | Pezdirtz et al. . |
| 3,678,275 | 7/1972 | Schneider et al. ...................... 250/374 |

FOREIGN PATENT DOCUMENTS

| | | | |
|---|---|---|---|
| 0524367 | 1/1993 | European Pat. Off. . | |
| 242494 | 1/1987 | Germany . | |
| 244642 | 4/1987 | Germany . | |
| 4012169 | 10/1991 | Germany . | |
| 297878 | 1/1992 | Germany ......................... | 250/370.07 |
| 299499 | 4/1992 | Germany ......................... | 250/370.07 |
| 299770 | 7/1992 | Germany . | |
| 301581 | 3/1993 | Germany . | |
| 3-239986 | 10/1991 | Japan ................................ | 250/370.07 |

OTHER PUBLICATIONS

Austrian Patent Office Preliminary Communications Report dated Jan. 31, 1995.

*Primary Examiner*—Edward J. Glick
*Attorney, Agent, or Firm*—Greenblum & Bernstein, P.L.C.

[57] ABSTRACT

Process and system for determining radiation exposure in airplanes The invention pertains to a process for the determination of the radiation load, respectively the dosage (effect) of the radiation prevailing in airplanes with the aid of an algorithm, with which the spectral composition of the encumbering radiation can be determined and which is subject to the altitude as well as the geographical, respectively the geomagnetic longitude and latitude, respectively, that the portions of the individual types of radiation of the locally total spectrum can be determined, or else have been determined. In accordance with the invention, there is provided that aboard the airplane, the (equivalent) dosage (effect) of a single type of radiation, for example, gamma radiation, is determined and is multiplied by the determined portion factor of this type of radiation, with this type of radiation including a portion of the locally expected total spectrum and that the product thereof, as an actual (equivalent) dosage (effect) is indicated or evaluated and/or stored. A system for the noted determination is also set forth.

14 Claims, 1 Drawing Sheet

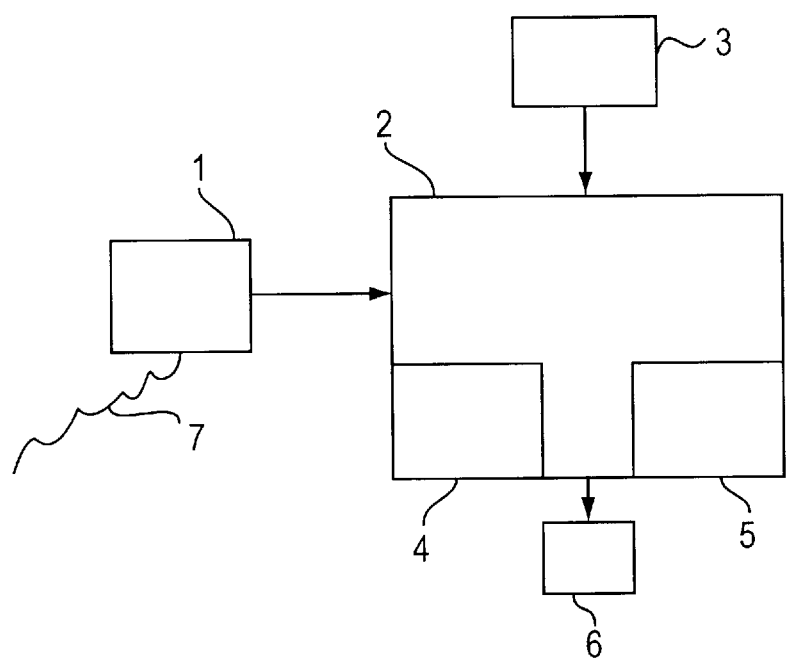

PROCESS AND SYSTEM FOR DETERMINING EXPOSURE IN AIRPLANES

CROSS-REFERENCE TO RELATED APPLICATION

This application claims the priority under 35 U.S.C. §119 of Austrian application No. 425/94, filed on Mar. 1, 1994, the disclosure of which is hereby incorporated by reference in its entirety.

CROSS REFERENCE TO RELATED APPLICATIONS

This application claims the priority of Austrian Application No. AT 425/94, filed Mar. 1, 1994, the disclosure of which is incorporated herein by reference in its entirety.

BACKGROUND OF THE INVENTION

1. Field of the Invention

The invention pertains to a process and system for the determination of the radiation dosage prevailing in an airplane with the aid of an algorithm.

2. Discussion of the Background of the Invention and Material Information

With the use of modern airplanes, which has led to increasing average flight altitudes, the problem of altitude radiation load or exposure of passengers and especially of flight personnel can no longer be ignored. In particular, a new recommendation (IRCP 60) by the International Commission for Radiation Protection sets forth that the natural radiation loads or exposure during flights in commercial aircraft is to be included in the professional radiation exposure of the flight personnel. It is also noteworthy that military airplanes fly at ever increasing altitudes and that the occurring radiation exposure thus increases considerably. As a result of the new evaluation of the quality-(portion or contribution)-factors for neutron radiation, contribution of differing radiation types with respect to the total equivalent dosage is caused by the total radiation spectrum. As the altitude increases, the increased in contribution may be comparison to the previous values, so that this value now accounts for about three fourths of the total dose.

While the average yearly radiation load/exposure of the entire population, including radiation-exposed persons is about 2 mSv/year, this exposure for flight personnel can reach up to 10 mSv/year. During the last several years, expensive measurements have been conducted of the exposure in passenger airplanes and thus provide the basis for sufficiently accurate data concerning the actual radiation exposure.

The cosmic radiation at commercial flight or cruising altitude is comprised particularly of particle radiation and protons, whereby the galactic portion of the cosmic radiation is largely (85%) caused through a primary radiation of protons that originate in intergalactic space. The flux density of the galactic particle radiation which occurs at the earth atmosphere changes in time in opposition to the 11 year cycle of the sun activity, since the charged particles, via the magnetic field of the solar wind, are partially reflected into space. At a 12 km altitude the dosage effect (dose rate) changes about 20% as a result of the sun cycle.

The occurring protons are braked at the upper layers of the atmosphere and thereby produce a broad spectrum of secondary particles such as gamma rays, electrons, mesons as well as neutrons. The spatial distribution of the proton field is greatly dependent upon the magnetic field of the earth and thus dependent upon the geographic longitude and latitude. The particle stream, as a result of the shielding effect of the atmosphere, increases with increasing altitude, just as the secondary spectrum of the radiation changes with altitude. All together, the radiation load or exposure is thereby dependent upon the altitude of the airplane as well as the geographic length or longitude and the geographic width or latitude.

For the calculation of the spectral composition of the occurring total radiation, in dependence of the geographic position and the altitude, a special algorithm was developed; as a first approximation one can assume, for an altitude of 10 km, a dosage effect of about 8 to 10 $\mu$Sv/hour.

During the times of increased sun activity (solar cycles), so-called "Solar flares" can occur, that is, time limited zones of increased radiation intensity, which can exceed up to one hundred times the previously-noted galactic values. These occasional eruptions, usually last for several minutes and cannot be predicted. One maximum in 1956, occurred, for example at a value of 10 mSv/hour at an altitude of 12 km. On average, for such an occurrence, a value of about 100 $\mu$Sv/hour can be established. Since 1956 a number of such flares, with a dosage effect (dose rate) of over 100 $\mu$Sv/hour have been observed.

From the particle induction of the cosmic radiation the energy dose in tissue can be calculated. The biologically effective dosage is produced via the utilization of a radiation specific weight factor from the energy dosage quality. This factor varies, in any case, depending upon particle type and particle energy from 1 to 20. Via changes of these factors, as a result of the recommendation of the International Commission for Radiation Protection, the portion (contribution) of the effective dosage originating from neutrons is now valued at about 60% higher than previously.

One can proceed from the basis that the radiation load exposure of the flight personnel during its stay or presence at the cruising altitude, depending upon route and number of block hours (air hours at cruising altitude), lies in the region of 5 to 10 Msv/year. With that, it is substantially above the average yearly dose of professionally radiation exposed persons in Austria (about 1.5 mSv/year), however below half of the future limit value for professionally radiation exposed persons of 20 mSv/year in accordance with the recommendation of the International Commission for Radiation Protection (ICRP 60).

The actual radiation exposure of the flight personnel in commercial and military airplanes can principally be determined via active, that is direct indication, or through passive, that is integrating dosimeters. One can proceed from the basis that, the local or resident dosimeter on board, in place of individual personal dosimeters, are sufficient, whereby the relation for the personal dosage takes place via the flight utilization plans. Principally utilized as active dosimeters are tissue equivalent proportional counter (TEPC), which, in view of their measuring accuracy and independence of energy, have shown good results. In actual practice however, due to their short life span and low safety of operation irrespective of their high cost, are poorly suited for routine usage.

A proven although very costly process is used in French and British air travel in the Concorde. All invading particles are actually measured with specific gamma and neutron detectors and thereafter combined with corresponding quality factors and the corresponding energy dosage in tissue is calculated. Here the dosage and the dosage effect values can be read in the cockpit and warnings can be provided at higher dosage effects.

Passive dosimeters, such as thermoluminescent dosimeters have the advantage of low cost, are robust, require little space and are independent of an energy supply, however they provide the accumulated dosage only retrospectively.

The main problem however resides in the immediate interpretation of the measurement values under extremely difficult measuring conditions of the existing or present mixed radiation field with a predominant portion of high energy corpuscular or electromagnetic radiation that is particularly prevalent at higher altitudes.

It is the goal of this invention to produce a remedy and an arrangement that provides, as an active dosimeter, an immediate and continuous measurement and indication at high measuring accuracy and independent from energy during the measurement of the radiation loading. Simultaneously, the measurement and the interpretation of the measurement result should be easy, exact, and occur quickly.

As a first embodiment of this invention, a process for the determination of the radiation dosage of the radiation prevailing in an airplane with the aid of an algorithm, comprises determining, with the aid of the algorithm, the spectral composition, that is the portion factors of the individual types of radiation of the total local spectrum of the radiation within the airplane, with the radiation being subject to the altitude as well as the geographical location, that is the geomagnetic longitude and latitude, respectively of the airplane; determining, aboard the airplane, the dosage of a single type of radiation; multiplying the dosage of the measured single type of radiation by the determined portion factor of this single type of radiation, with this type of radiation including the portion of the locally expected total spectrum; and at least one of indicating, evaluating and storing the product thereof, as an actual dosage of the local radiation. Preferably, the single type of radiation comprises gamma radiation.

In a further embodiment of the process of this invention, on the airplane, the portion factors depending on the altitude as well as the geographic positions of the airplane are one of presently determined and previously determined and carried along in stored form, in a form of at least one of predetermined altitude ranges and as portion factors, valid for predetermined delineated altitude and geographic ranges of the airplane.

Another embodiment of the process of this invention further comprises, measuring gamma rays appearing within the airplane, with the resulting measurement forming the basis of the determination.

Yet a differing embodiment of the process of this invention further comprises, measuring at least one of the altitude and the geographical location of the airplane, independently of the navigational equipment of the airplane. Preferably, the measuring is accomplished by using a GPS-system (global positioning system).

As yet another embodiment of this invention, in a system for the determination the radiation dosage of radiation prevailing in an airplane with the aid of an algorithm wherein, via the use of the algorithm, at least one of the spectral composition of the encumbering radiation, subject to the altitude as well as the geographical, respectively the geomagnetic longitude and latitude of the airplane, can be determined, and the portion of the respective type of radiation of the locally expected total spectrum can at least of be determined or has previously been determined, the system further comprises that at least one of the algorithm and the determined portion factor is carried along in the airplane in the storage memory portion of a computer; that a dosage measuring device is provided for the measurement of a single, determined type of radiation, with the measuring device being attached to the computer and that the computer is one of provided with the portion factor for the multiplication of the measured signals, respectively the value measured by the measuring device, and functions as a multiplication apparatus; and that the computer at least one of stores the computational results and forwards same for display at a display indicator.

In yet a differing embodiment of the system of this invention, the determined type of radiation comprises one of gamma and neutron rays.

In still a further embodiment of the system of this invention, the dosage measuring unit for measuring radiation comprises one of a Geiger-Müller-counting tube, a photomultiplier counter and an ionization chamber. Preferably, the dosage measuring unit measures gamma rays and comprises a $BF_3$-counting tube for neutrons.

In still an additional embodiment of the system of this invention, a navigational device for the determination of at least one of the altitude and the geographic position of the airplane, is attached to the computer and is independent of the navigation equipment of the airplane. Preferably, the navigational device comprises a GPS-system (global positioning system).

In yet still a differing embodiment of the system of this invention, in dependence upon the signals of the navigational device, the portion factors for at least one of the specific altitude and positional regions are retrievable from the memory storage portion of the computer and accessible for running a program on the computer. Preferably, the navigational device comprises a GPS-system (global positioning system).

In still another embodiment of the system of this invention, in dependence upon the signals of the navigational device, a calculation of the portion factors is carried out, with the aid of the carried-along algorithm, in the course of running a program on the computer. Again, the navigational device comprises a GPS-system (global positioning system).

The operational procedure in accordance with this invention resides therein, that the dosage (effect) (dose rate) of the gamma radiation occurring in the airplane is measured on board by means of a known, relatively simple, gamma dosage effect measuring system, for example, Geiger-Müller counting tubes. Simultaneously, the procedure may calculate, via a suitable known, algorithm, in dependence of the geographic position (geomagnetic latitude and longitude) as well as the instantaneous altitude, the spectral composition of the cosmic radiation at the position of the airplane. A portion (contribution) factor is calculated which indicates the contribution of the neutron radiation (respectively, the portion (contribution) of the remaining components) of the cosmic radiation for the total effective equivalent dosage. This contribution of the neutron radiation toward the total spectrum of the radiation varies in a certain extent in dependence on the altitude as well as the geographic position of the airplane; and is calculated via the algorithm and determined by the contribution factors that are stored in memory on the airplane. The contribution factors may be dependent upon the altitude and the geographic position of the airplane.

Thereupon, via the use of this locality-dependent portion (contribution) or share factor, the measure gamma dosage (effect) dose rate is multiplied in order to obtain the actual (equivalence) dosage (effect).

For the automatic determination of the altitude and the geographic position, a separate, known GPS-receiver (global positioning system) is utilized; therewith the position and altitude determination can be achieved without intervening into the navigational system of the airplane.

In accordance with the operational procedure of this invention, a measurement value W is obtained aboard the airplane with a dosage (effect) measurement system. In a computer, respectively in the memory device of the computer, share portions (contribution factors), relating to the altitude and/or geographic position, are carried along (or calculated in accordance with an algorithm), with the share portions indicating the portion of each measured radiation of the entire spectrum of the cosmic radiation. These share or portion factors A are calculated, for example, via a division of the total dosage of the total spectrum Q by the dosage $Q_N$ of the respective measured radiation (A=Q total/$Q_N$).

The thus calculated value W.A in the computer corresponds therefore to the actual (equivalent) dosage (effect) in the airplane.

Instead of a measurement of the gamma radiation, a measurement of the neutron radiation or proton radiation, etc., can also follow therefrom.

The operational procedure of this invention has the advantage that the dosage determination is based on an actual or real measurement value or on a radiation component, particularly gamma radiation component, so that, for example, solar flares and other not foreseeable changes of the radiation, opposite to the expected total dosage values are considered therewith. A simple, robust, and relatively inexpensive radiation detector for gamma radiation is utilized, which, for example, utilizes two Geiger-Müller-counting tubes, and the determination of the locality-dependent and altitude-dependent spectral composition portion factors can readily follow from a calculation, via computers.

Therewith, a relatively simple, exact measurement system for the radiation loading or exposure of the flight personnel is realized, which, with the exception of the electric power supply, is self-sufficient and independent of the navigational system of the airplane so that the danger of feedback can be eliminated from the very beginning.

The computer can include a memory device for the storage of the dosage values in real time, so that the total actual radiation exposure for the flight can be scanned at all times and as a result of the flight plans can be coordinated electronic data-wise according to the respective flight personnel.

In addition, it is possible, upon need, to provide an indication of the actually occurring dosage effect in the cockpit and couple therewith a warning relative to extraordinary high dosages (effect), for example during solar flares, so that the pilot, if the need arises, can change to a lower flight altitude in which there is a lower dosage effect.

BRIEF DESCRIPTION OF THE DRAWING

The invention will be better understood and objects other than those set forth above will become apparent when consideration is given to the following detailed description thereof. Such description makes reference to the annexed single drawing which is a schematic showing of the system of the subject invention.

DETAILED DESCRIPTION OF THE PREFERRED EMBODIMENTS AND BEST MODE

Numeral 1 denominates a dose or dosage rate or effect measurement system, whose output signal is channelled to a computer or processing unit 2. The processing unit or computer 2 includes a memory or storage device 4 for an algorithm or for the share portion factors. In addition, computer 2 includes a storage or memory device 5 for the calculated dosage values. Attached to the computer is a display device/visual indicator or warning device 6 from which the dosage can be read out. Furthermore, an apparatus 3 is attached to computer 2 via which the current flight altitude and geographic position of the airplane can be determined. In dependence upon the measurement values of this apparatus 3, the portion factors from the memory device 4 are provided for computer 2, or the algorithm for the calculation of the share factors is correspondingly processed and the measurement values of measurement system 1 are manipulated herewith.

Since the algorithm concerning the interrelationship between the altitude and the geographic position presupposes a relatively extensive arithmetical operation, in a preferred embodiment of this invention there can be arranged that the algorithm is not stored or carried in the computer but rather that the computer contains already determined portion factors in list form, respectively in stored memory form, with the portion factors being dependent upon the altitude and the geographic position, with which the determined measurement values of radiation types, at the actual geographic positions and actual altitudes, must be multiplied in order to determine the total dosage (effect) at this location. A multiplication of the measurement values at the momentary position, with this position factor, therewith provides the total dosage of the actually occurring radiation 7 at this time and at this position. The portion factors can be given for geographic regions, for example, for area regional extents of 10×10 km and/or for altitude layers having a ceiling of, for example, 1 km.

A further alternative can comprise that the portion factors for the entire earth surface need not be carried (in the computer), but rather, for example, only those for the northern or southern hemispheres or even only those for a specific flight route under the consideration of possible alternate routes in the case of inclement weather, etc.

Principally, the evaluation of the measurement signals and their linkage with the portion factors can also result from an analog operational procedure.

The measurement of the dosage is therewith carried out particularly centrally for the entire airplane at one location. The result applies to all carried passengers.

While there are shown and described present best mode embodiments of the invention, it is to be distinctly understood that the invention is not limited thereto, but may be otherwise variously embodied and practiced within the scope of the following claims and the reasonably equivalent compounds thereto. Further, the invention illustratively disclosed herein may be practiced in the absence of any element which is not specifically disclosed herein.

What is claimed is:

1. A process for determining one of a radiation exposure and a dose of radiation prevailing in an airplane in flight, the process comprising:

measuring, aboard the airplane, a plurality of doses for one of a plurality of types of radiation, each of the plurality of types of radiation being included within a total radiation spectrum within the airplane;

determining, by a predefined algorithm, a plurality of contribution factors, each contribution factor associated with the one of the plurality of types of radiation, and determined in accordance with an altitude of the airplane and a geographical position of the airplane, the geographical position including a geomagnetic longitude and latitude;

multiplying each of the plurality of measured doses for the one of the plurality of types of radiation by the determined contribution factor associated with the one of the plurality of types of radiation and associated with the current geographical position of the airplane to produce a product; and at least one of indicating, evaluating and storing each product as a representative of one of the radiation exposure and the dose of the radiation prevailing in the airplane.

2. The process of claim 1, wherein the one of the plurality of types of radiation comprises gamma radiation.

3. The process of claim 1, wherein, on the airplane, the contribution factors comprise one of current contribution factors determined on the airplane during the flight and previous contribution factors determined and stored in the airplane prior to the flight.

4. The process of claim 1, further comprising, measuring at least one of the altitude and the geographical position of the airplane during the flight, the at least one of the altitude and geographical position measuring being performed independently of navigational equipment of the airplane.

5. The process of claim 4, wherein the at least one of the altitude and geographical position measuring is accomplished by using a GPS-system (global positioning system).

6. A system for determining a radiation exposure or a dose of radiation prevailing in an airplane in flight, comprising:

a measuring device for measuring one of a plurality of types of radiation, the plurality of types of radiation included within a total radiation spectrum within the airplane;

a computer coupled to the measuring device;

a storage device associated with the computer;

at least one contribution factor determined in accordance with an altitude of the airplane and a geographical position of the airplane, the geographical position including a geomagnetic longitude and latitude;

the computer multiplying at least one signal from the measuring device and a respective one of the at least one contribution factor associated with the current position of the airplane to produce a product representative of the radiation prevailing in the airplane;

an indicator; and the storage device for storing at least one of the at least one contribution factor and an algorithm for determining the at least one contribution factor and the computer forwarding the product to the indicator for display.

7. The system of claim 6, wherein the measured type of radiation comprises one of gamma rays and neutron rays.

8. The system of claim 6, wherein the measuring device for measuring radiation comprises one of a Geiger-Müller-counting tube, a photomultiplier counter and an ionization chamber.

9. The system of claim 6, wherein the measuring device measures gamma rays or comprises a $BF_3$-counting tube for measuring neutrons.

10. The system of claim 6, further comprising a navigational device for determining at least one of the altitude and the geographical position of the airplane being coupled to the computer, the navigational device being independent of the navigation equipment of the airplane.

11. The system of claim 10, wherein the navigational device comprises a GPS-system (global positioning system).

12. The system of claim 10, wherein, in dependence upon signals of the navigational device, the contribution factor for at least one of a specific altitude and a specific geographical position is retrievable from the storage device associated with the computer and accessible for running a program stored in the computer.

13. The system of claim 10, wherein, in dependence upon signals of the navigational device, calculation of each contribution factor is carried out by an algorithm stored in a program running on the computer.

14. The system of claim 6, the at least one contribution factor comprising one of a current contribution factor determined on the airplane during the flight and a previous contribution factor determined and stored in the airplane prior to the flight.

* * * * *